US011307419B2

(12) United States Patent
Yoshida

(10) Patent No.: US 11,307,419 B2
(45) Date of Patent: *Apr. 19, 2022

(54) DISPLAY APPARATUS

(71) Applicant: SEIKO EPSON CORPORATION, Tokyo (JP)

(72) Inventor: Shohei Yoshida, Shimosuwa-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/101,129

(22) Filed: Nov. 23, 2020

(65) Prior Publication Data

US 2021/0072550 A1 Mar. 11, 2021

Related U.S. Application Data

(63) Continuation of application No. 15/834,560, filed on Dec. 7, 2017, now Pat. No. 10,877,271.

(30) Foreign Application Priority Data

Dec. 28, 2016 (JP) .............................. JP2016-255073

(51) Int. Cl.
  *G02B 27/01* (2006.01)
  *G02B 6/00* (2006.01)
  *F21V 8/00* (2006.01)
(52) U.S. Cl.
  CPC ....... *G02B 27/0172* (2013.01); *G02B 6/0031* (2013.01); *G02B 6/0055* (2013.01);
  (Continued)

(58) Field of Classification Search
  None
  See application file for complete search history.

(56) References Cited

U.S. PATENT DOCUMENTS 6,829,095 B2 12/2004 Amitai
10,877,271 B2 * 12/2020 Yoshida ............... G02B 6/0055
(Continued)

FOREIGN PATENT DOCUMENTS

JP 2004-157520 A 6/2004
JP 2007-505353 A 3/2007
(Continued)

OTHER PUBLICATIONS

Apr. 8, 2019 Office Action issued in U.S. Appl. No. 15/834,560.
Oct. 11, 2019 Office Action issued in U.S. Appl. No. 15/834,560.
Feb. 18, 2020 Office Action issued in U.S. Appl. No. 15/834,560.

*Primary Examiner* — Michelle M Iacoletti
*Assistant Examiner* — Danell L Owens
(74) *Attorney, Agent, or Firm* — Oliff PLC

(57) ABSTRACT

A display apparatus includes an image forming device and a light guide. The light guide includes an incident portion and an emission portion including a plurality of mirrors. In the light guide, the total reflection surface is disposed to be inclined with respect to a virtual plane perpendicular to a visual axis, and the mirrors are disposed to be inclined with respect to the total reflection surface. The mirror angle is set such that the light guide angle, the mirror angle, the light angle, the limit incidence angle, and the refractive index of the light guide satisfy the predetermined relationship.

6 Claims, 7 Drawing Sheets

(52) U.S. Cl.
    CPC ........... *G02B 2027/0125* (2013.01); *G02B 2027/0178* (2013.01)

(56)  References Cited

U.S. PATENT DOCUMENTS

| | | | |
|---|---|---|---|
| 2003/0165017 A1* | 9/2003 | Amitai | G02B 27/0172 359/636 |
| 2004/0085649 A1 | 5/2004 | Repetto et al. | |
| 2007/0091445 A1 | 4/2007 | Amitai | |
| 2012/0044571 A1 | 2/2012 | Mukawa | |
| 2017/0045744 A1 | 2/2017 | Amitai | |

FOREIGN PATENT DOCUMENTS

| | | |
|---|---|---|
| JP | 4508655 B2 | 7/2010 |
| JP | 2012-042654 A | 3/2012 |
| JP | 2017-520013 A | 7/2017 |
| WO | 03/081320 A1 | 10/2003 |
| WO | 2005/024969 A2 | 3/2005 |
| WO | 2015/162611 A1 | 10/2015 |

* cited by examiner

DISPLAY APPARATUS

This is a Continuation of application Ser. No. 15/834,560 filed Dec. 7, 2017, which in turn claims priority to Japanese Application No. 2016-255073 filed Dec. 28, 2016. The entire disclosures of the prior applications are hereby incorporated by reference herein in their entirety.

BACKGROUND

1. Technical Field

The present disclosure relates to a display apparatus.

2. Related Art

Recent years, as one of wearable information devices, an image display apparatus in a type of being worn on the head of an observer such as a head mount display is provided. In addition, an image display apparatus capable of simultaneously and visually recognizing both an image generated by a display element and an image of the outside of the observer when the observer wears the image display apparatus, a so-called see-through type image display apparatus is known.

In JP-A-2012-42654, a display apparatus is disclosed, which includes an image forming device, a collimating optical system for collimating light from the image forming device, a light guide optical device for guiding and emitting the light from the collimating optical system, and a moving device for relatively moving an optical axis of the image forming device and an optical axis of the collimating optical system and adjusting a convergence angle. The light guide optical device includes a light guide plate and a plurality of mirrors provided inside the light guide plate so as to be inclined with respect to the plate surface.

In Japanese Patent No. 4,508,655, an optical device is disclosed, which includes a display source, a collimating lens, and a light-transmitting substrate. The light-transmitting substrate includes a first reflection surface that takes the light from the display source into the device and a second reflection surface that causes the light guided into the device to be emitted toward the eyes of the observer, and each of the light-transmitting substrate is inclined with respect to the substrate surface.

As described above, the display apparatuses in JP-A-2012-42654 and Japanese Patent No. 4,508,655 include a plurality of mirrors or reflection surfaces for causing the light traveling inside the light guide to be emitted toward the eyes of the observer. However, there is a problem in that a display unevenness caused by the plurality of mirrors or the reflection surfaces positioned in front of the eyes of the observer is visually recognized.

SUMMARY

An advantage of some aspects of the embodiment is to provide a display apparatus that can suppress the display unevenness from being visually recognized.

The embodiment can be realized by in the following aspects. According to an aspect of the embodiment, a display apparatus includes an image forming device and a light guide that guides an image light generated by the image forming device. The light guide includes an incident portion that causes the image light emitted from the image forming device to be incident on inside of the light guide, and an emission portion including a plurality of mirrors that are provided parallel to each other inside the light guide with an interval therebetween, and cause a part of the image light guided inside the light guide to be reflected and cause another part of the image light to be transmitted. The light guide has a total reflection surface that guides the image light, and the total reflection surface is disposed to be inclined with respect to a virtual plane perpendicular to a visual axis. Each of the plurality of mirrors is disposed to be inclined with respect to the total reflection surface. When an inclination angle of the total reflection surface with respect to the virtual plane is defined as a light guide angle $\alpha$, an inclination angle of each of the plurality of mirrors with respect to the total reflection surface is defined as a mirror angle $\beta$, an angle between a light beam incident on an eye of an observer and the visual axis is defined as a light beam angle $\eta$, an incidence angle of the image light when the reflectance of the image light becomes 0 with respect to each of the plurality of mirrors is defined as a limit incidence angle $\theta_{th}$, and a refractive index of the light guide is n, the angle $\beta$ of each of the plurality of mirrors is set so as to satisfy Expressions (1), (2), and (3) described below.

$$\beta_1 < \beta \le \beta_2 \quad (1)$$

$$\beta_1 = \tfrac{1}{2} \times [\sin^{-1}(1/n) + \sin^{-1}(\sin(\eta+\alpha)/n)] \quad (2)$$

$$\beta_2 = \tfrac{1}{3} \times [\theta_{th} + \sin^{-1}(\sin(\eta+\alpha)/n)] \quad (3)$$

The angle $\beta$ of each of the plurality of mirrors is set so as to satisfy the above-described expressions (1), (2), and (3).

In the display apparatus according to the aspect, when the image light is guided inside the light guide and is transmitted through a plurality of mirrors, a part of the image light is reflected by the mirror and is emitted from the light guide toward the eyes of the observer. At this time, the inventor have found that the error between the designed number of mirrors through which the image light is to be originally transmitted in the design of the light guide and the number of mirrors through which the image light is actually transmitted influences the display unevenness, and the display unevenness can be reduced as the above-described error is reduced.

According to the display apparatus in an aspect of the embodiment, since the mirror angle $\beta$ is set so as to satisfy the Expressions (1), (2), and (3), the error in the number of mirrors can be reduced, and thus, it is possible to reduce the display unevenness. In addition, by satisfying the Expressions (1), (2), and (3) described above, both the loss of the image light and the occurrence of a double image (ghost) are suppressed, and thus, a bright and clear image can be obtained.

In the display apparatus according to the aspect of the embodiment, the light beam angle $\eta$ may be equal to or larger than 10 degrees and equal to or smaller than 15 degrees, and the refractive index n may be equal to or larger than 1.4 and equal to or smaller than 1.8.

According to this configuration, it is possible to provide a highly practical display apparatus.

In the display apparatus according to the aspect of the embodiment, the light guide angle $\alpha$ may be equal to larger than 4 degrees.

An advantage of some aspects of the embodiment is that the display unevenness can be more reliably reduced.

BRIEF DESCRIPTION OF THE DRAWINGS

The embodiment will be described with reference to the accompanying drawings, wherein like numbers reference like elements.

DESCRIPTION OF EXEMPLARY EMBODIMENTS

Hereinafter, an embodiment will be described using the drawings.

The display apparatus in the present embodiment is used as, for example, a head mount display.

Figure 1:
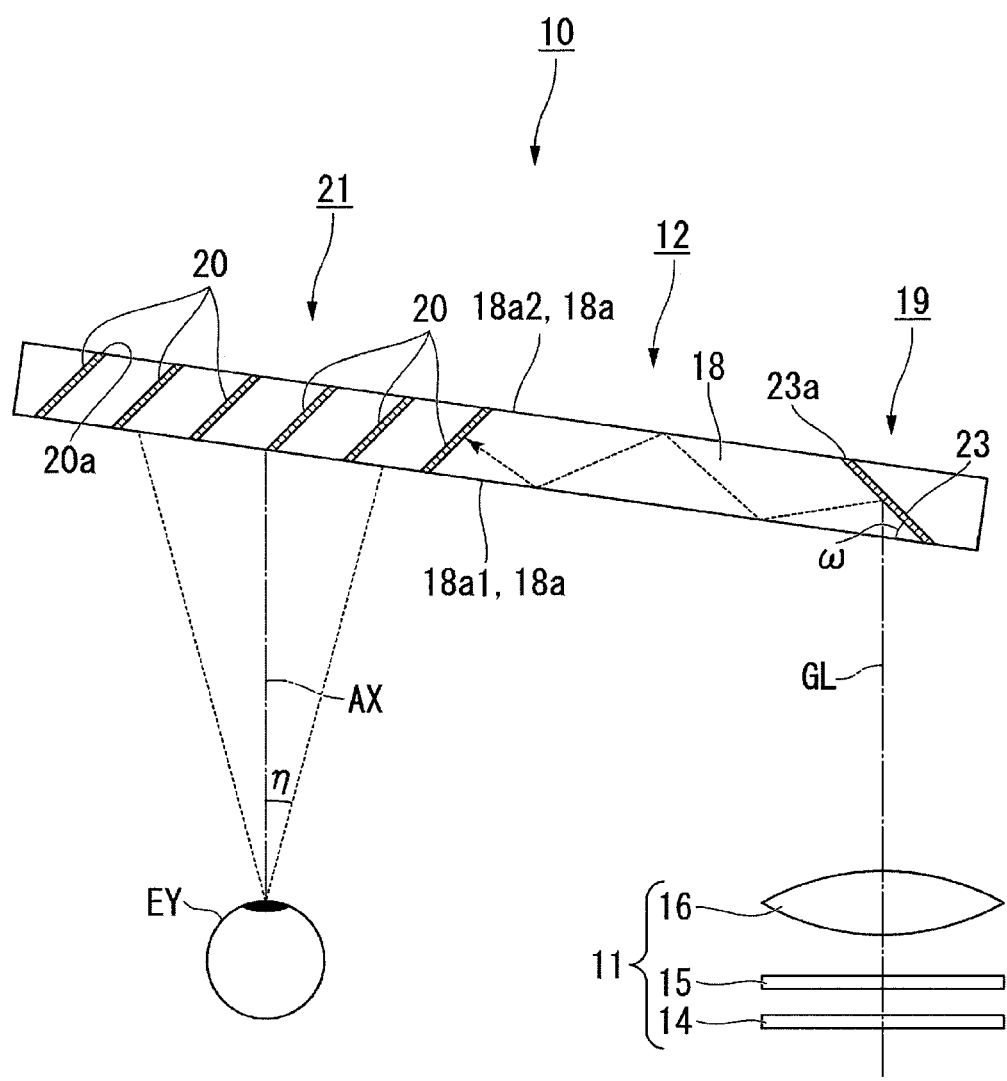
FIG. 1 is a plan view of a display apparatus in an embodiment.
Figure 2:
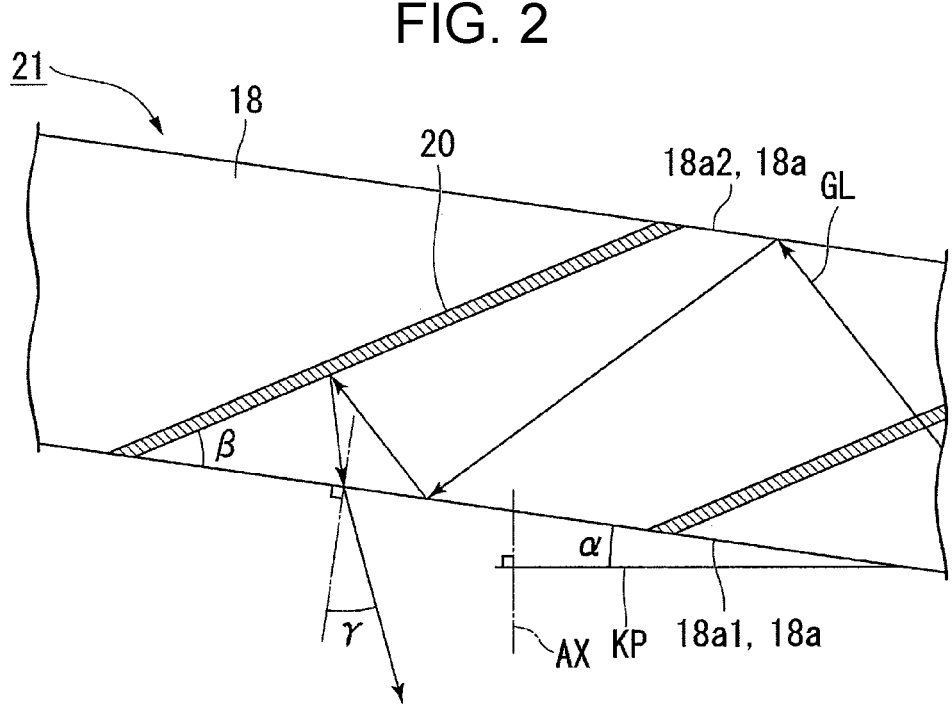
FIG. 2 is an enlarged view of an emission portion.

FIG. 1 is a plan view of a display apparatus in an embodiment. FIG. 2 is an enlarged view of an emission portion.

In the following drawings, in order to make each configuration element easier to see, the scales of dimensions may be different from each other depending on the configuration elements.

Overall Configurations of the Light Guide Device and the Display Apparatus

As illustrated in FIG. 1, the display apparatus 10 includes an image forming device 11 and a light guide device 12. The display apparatus 10 causes an observer to visually recognize the display image as a virtual image and causes the observer to observe the external image in a see-through manner. In the display apparatus 10, a pair of image forming devices 11 and light guide devices 12 are provided corresponding to the right eye and the left eye of the observer. Since the device for the right eye and the device for the left eye are symmetrical, only the device for the right eye is illustrated here and the device for the left eye is omitted to be illustrated. The display apparatus 10 includes a temples (not illustrated) which is put on the ears of the observer, and has an appearance like glasses as a whole.

The image forming device 11 includes a light source 14, a liquid crystal panel 15, and a projection lens 16. The liquid crystal panel 15 spatially modulates illumination light emitted from the light source 14 to form a video image or other image light GL to be displayed. The projection lens 16 is a collimating lens which causes the image light GL emitted from each point on the liquid crystal panel 15 to be emitted as substantially parallel light beams.

The projection lens 16 is formed with glass or plastic, and may be configured with plural pieces of lenses, not limited to one piece. As the projection lens 16, a spherical lens may be used, an aspherical lens, a free-form surface lens, or the like may be used.

The light guide device 12 includes a light guide 18 and the light guide 18 includes an incident portion 19 and an emission portion 21 having a plurality of mirrors 20. In a state in which the observer is wearing the display apparatus 10, the incident portion 19 is provided on the side close to the ear, and the emission portion 21 is provided on the side close to the eye. The light guide 18 guides the image light GL inside the light guide. The incident portion 19 causes the image light GL emitted from the image forming device 11 to be incident on the inside of the light guide 18. The emission portion 21 reflects the image light GL guided inside of the light guide 18 using a plurality of mirrors 20, and deflects the image light to be emitted to the outside of the light guide 18. The light guide device 12 emits the image light GL formed by the image forming device 11 toward the eye EY of the observer as the virtual image light, and transmits the external light EL forming the external image and leads the external image to the eye EY of the observer.

Here, a line of sight (optical axis) when the display apparatus 10 is seen from the front thereof by the eye EY of the observer at the designed pupil position of the display apparatus 10 is referred to as a visual axis AX. The angle formed by the light beam incident on the eye EY of the observer with respect to the visual axis AX is defined as a light beam angle η.

The light guide 18 is configured with a flat light transmitting member. For example, the light guide 18 is molded with a resin material or a glass material having a high light transmittance. The light guide 18 includes two total reflection surfaces 18a which are parallel to each other. In a state in which the observer wears the display apparatus 10 on the head, among the two total reflection surfaces 18a, a surface positioned at the observer side is referred to as an observer surface 18a1 and a surface positioned at the external side is referred to as an external surface 18a2.

As illustrated in FIG. 2, in the light guide 18, the total reflection surface 18a (the observer surface 18a1 and the external surface 18a2) is disposed so as to be inclined with respect to a virtual plane KP perpendicular to the visual axis AX. Here, an inclination angle of the total reflection surface 18a with respect to the virtual plane KP is defined as a light guide angle α. Since the observer surface 18a1 and the external surface 18a2 are parallel to each other, the angle formed by the observer surface 18a1 and the virtual plane KP and the angle formed by the external surface 18a2 and the virtual plane KP are equal to each other. However, in FIG. 2, the light guide angle α is illustrated as the angle formed by the observer surface 18a1 and the virtual plane KP. In other words, the normal direction of the total reflection surface 18a of the light guide 18 is inclined by the angle α with respect to the visual axis AX.

As illustrated in FIG. 1, the incident portion 19 is configured with a mirror 23 provided inside the light guide 18. A reflection film made of a metal having high reflectance such as aluminum is used as the mirror 23. Alternatively, a dielectric multilayer film in which a plurality of dielectric thin films having different refractive indexes are alternately laminated may be used as the mirror 23. The mirror 23 is provided to be inclined with respect to the observer surface 18a1 of the light guide 18 in such a direction that an end portion 23a of the mirror 23 on the external surface 18a2 side inclines toward the emission portion 21 side. The inclination angle ω of the mirror 23 is appropriately set according to the positional relationship between the image forming device 11 and the light guide 18.

The emission portion 21 includes a plurality of mirrors 20 provided inside the light guide 18 in parallel with each other at the same interval (pitch). Each of the plurality of mirrors 20 reflects a part of the image light GL guided in the inside of the light guide 18 and transmits the other part of the image light GL. In this way, the mirror 20 of the emission portion 21 functions as a so-called partially reflecting mirror. Like the mirror 23 of the incident portion 19, a reflection film made of a metal having a high reflectance such as aluminum is used as the mirror 20. Alternatively, a dielectric multilayer film may be used as the mirror 20.

Contrary to the mirror 23 of the incident portion 19, the mirror 20 of the emission portion 21 is inclined with respect to the observer surface 18a (total reflection surface 18a1) of the light guide 18 in such a direction that the end portion 20a of the mirror 20 on the external surface 18a2 side collapses toward the incident portion 19 side.

As illustrated in FIG. 2, an inclination angle of the mirror 20 with respect to the total reflection surface 18a of the light guide 18 is defined as a mirror angle β. In FIG. 2, the mirror angle β is illustrated as the inclination angle of the mirror 20 with respect to the observer surface 18a1 of the light guide 18. However, it is assumed that $0° < β < 90°$. In addition, an emission angle of the light beam emitted from the observer surface 18a1 of the light guide 18 is defined as γ.

The image light GL incident on the emission portion 21 is deflected at the emission portion 21 so as to be extracted from the light guide 18, and is emitted from the observer surface 18a1. The image light GL emitted from the observer surface 18a1 is incident on the eye EY of the observer as virtual image light. By an image formed on the retina of the observer by the virtual image light, the observer can recognize the virtual image by the image light GL.

Regarding the Principle of the Display Unevenness and Measures for Improvement

Here, the principle of occurrence of the display unevenness in the display apparatus in the related art will be described with reference to FIG. 3.

The inventor have found that the number of mirrors through which the light beam is transmitted is different depending on the angle of view of the light beam, and this fact becomes a cause of the display unevenness being visually recognized. In addition, even though the angles of view of the light beams are the same, the number of mirrors for transmission varies depending on the mirror angle β.

Here, in order to evaluate the display unevenness, a parameter called an error of the number of mirrors for transmission is considered. The "error of the number of mirrors for transmission" is a deviation of the number of mirrors through which the light beam actually transmitted with respect to the number of mirrors through which the light beam to be originally transmitted at a predetermined angle of view. For example, the second mirror from the incident portion side needs to originally deflect the light beam transmitted through one mirror in the preceding stage to the observer side, and the fifth mirror from the incident portion side needs to deflect the light beam transmitted through four mirrors in the previous stage. That is, the design of the light guide device is performed based on a point that the light beam is transmitted through one mirror once.

Figure 3:
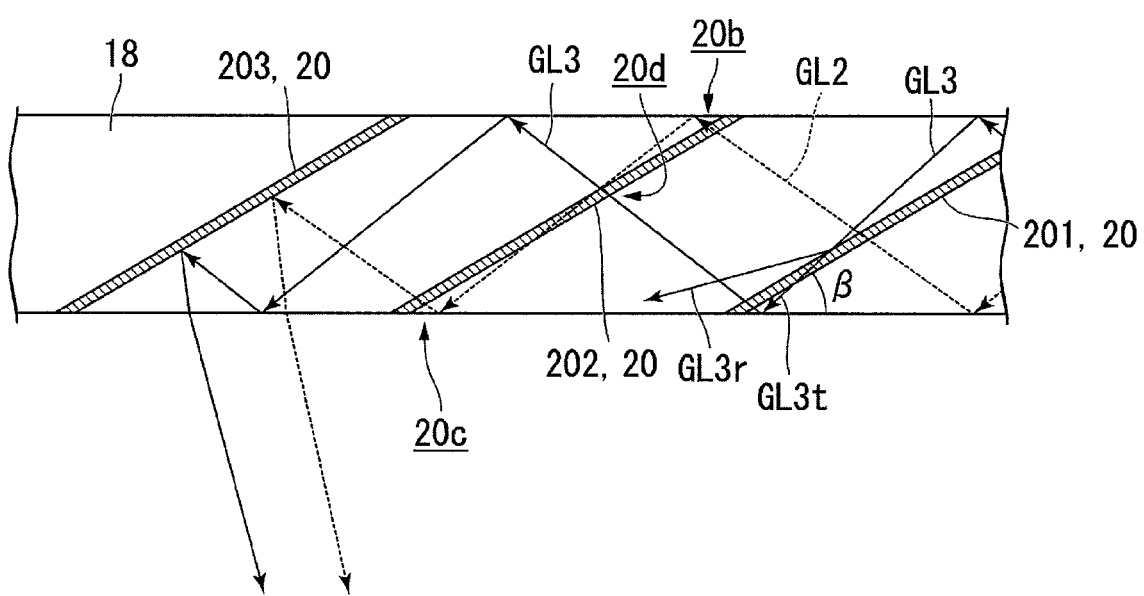
FIG. 3 is a diagram for describing a principle of occurrence of display unevenness.

However, focusing on the light beam GL2 illustrated by a dashed line in FIG. 3, due to the relationship between the angle of view and the mirror angle β, the light beam GL2 is transmitted twice through the second mirror 202 at the positions indicated by reference numerals 20b and 20c from the incident portion side. The number of transmissions through the mirror is counted as the transmission from the front side of the light beam to the back side in the traveling direction of the light beam, and is not count as the transmission from the back side of the light beam to the front side in the traveling direction. Therefore, regarding the light beam GL2, the third mirror 203 from the incident portion side has to deflect the light beam after being transmitted twice in total through the mirrors 201 and 202 in the previous stage, but deflects the light beam after being transmitted three times in total through the mirrors 201 and 202.

On the other hand, focusing on the light beam GL3 illustrated by a solid line in FIG. 3, the light beam GL3 is transmitted only once through the second mirror 202 at the position indicated by a reference numeral 20d from the incident portion side. Therefore, regarding the light beam GL3, the third mirror 203 from the incident portion side deflects the light beam after being transmitted twice in total through the mirrors 201 and 202 in the previous stage, which is a transmission state as designed. As a result, the intensity of the light beam GL2 lower than that of the light beam GL3. Due to this reason, the intensity of the light beams arriving at the observer at different angles becomes uneven, and thus, the display unevenness occurs on the whole image.

From the above consideration, if the error of the number of mirrors for transmission can be made zero throughout all the display angles of view, it is possible to make the most desirable state in which there is no display unevenness. Therefore, the standard deviation $σ_{count}$ of the error of the number of mirrors for transmission throughout all the display angles of view is used as an evaluation index of the display unevenness. As the standard deviation $σ_{count}$ count decreases, the display unevenness can be improved.

Figure 5:
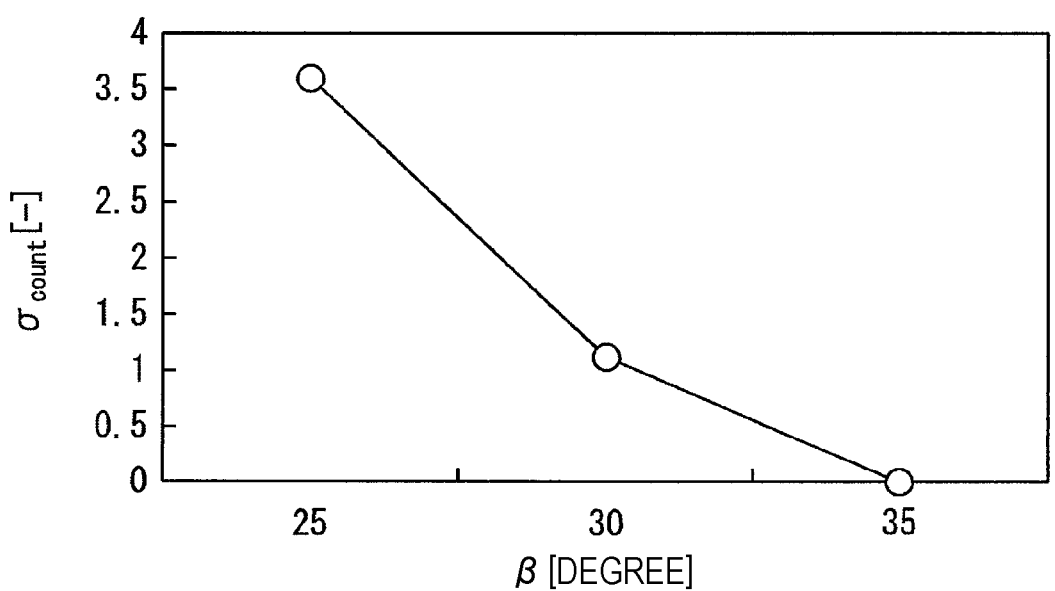
FIG. 5 is a diagram illustrating a relationship between a mirror angle β and a standard deviation $\sigma_{count}$ of an error of the number of mirrors for transmission.

FIG. 5 is a diagram illustrating a relationship between a mirror angle β and a standard deviation $σ_{count}$ of an error of the number of mirrors for transmission. In FIG. 5, the horizontal axis represents the mirror angle β (degree) and the vertical axis represents the standard deviation $σ_{count}$ (–).

As can be seen from FIG. 5, by increasing the mirror angle β, the standard deviation $σ_{count}$ can be reduced, and thus, it is possible to reduce the variations in the error of the number of mirrors for transmission. That is, in order to improve the display unevenness, it is preferable to increase the mirror angle β.

Regarding Limitations on Mirror Angle β

Incidentally, when setting the mirror angle β, there are two limitations as follows.

One limitation is a fact that the light beam of the whole angles of view has to propagate inside the light guide 18 without loss. To this end, the light beam of the whole display angles of view needs to satisfy the total reflection condition.

In order to satisfy the total reflection condition, the light beam needs to be incident on the total reflection surface 18a of the light guide 18 with a large incidence angle, that is, the light beam needs to be close to parallel to the total reflection surface 18a. For that purpose, the mirror angle β has to be larger than a threshold value β1 of the mirror angle at which the light beam satisfies the total reflection condition.

When the refractive index of the light guide 18 is n, the above condition is expressed by the following Expression (4).

$$\beta > \beta 1 = \frac{1}{2} \times [\sin^{-1}(1/n) + \sin^{-1}(\sin(\eta + \alpha)/n)] \quad (4)$$

Actually, the light beam deflected by the mirror 23 of the incident portion 19 reaches the emission portion after propagating inside the light guide 18, and is deflected by the mirror 20. Therefore, it may be difficult to understand the idea of adjusting the mirror angle β of the emission portion 21 in such a manner that the light beam satisfies the total reflection condition with respect to the total reflection surface 18a of the light guide 18. However, the inventor obtained a finding that, in a case of considering the mirror angle β of the emission portion 21, in order for a light beam of a certain specific angle of view to be incident on the eye EY of the observer, it is easy to study a consideration of configuring the light guide 18 by tracing the path in the direction opposite to the actual traveling path of the light beam from the eye EY of the observer in such a manner that the light guide 18 satisfies a certain specific condition. The description above is based on this finding.

Another limitation is a fact that the light beam having a large incidence angle to the mirror 20 should not be reflected. In FIG. 3, one of the reflected light beams from the mirror 20 is indicated by an arrow of a reference sign GL3r, but when the light beam having the large incidence angle to the mirror 20 is reflected from the mirror 20, the angle of the reflected light beam GL3r slightly deviates from the angle of the transmitted light beam GL3t. Due to this, there occurs another problem that a double image (ghost) is generated.

In order to reduce the incidence angle to the mirror 20, the light beam needs to be incident on the mirror 20 from a direction closer to perpendicular to the mirror 20. For that purpose, for example, as can be seen from the light beam GL3 incident on the first mirror from the incident portion side in FIG. 3, the mirror angle β has to be equal to or smaller than a specific threshold value β2.

The above condition is expressed by following Expression (5).

$\theta_{th}$ is a light beam incidence angle to the mirror 20 when the reflectance of the light beam in the mirror 20 is 0%, and is referred to as a limit incidence angle.

$$\beta \leq \beta 2 = \frac{1}{2} \times [\theta_{th} + \sin^{-1}(\sin(\eta + \alpha)/n)] \quad (5)$$

Figure 4:
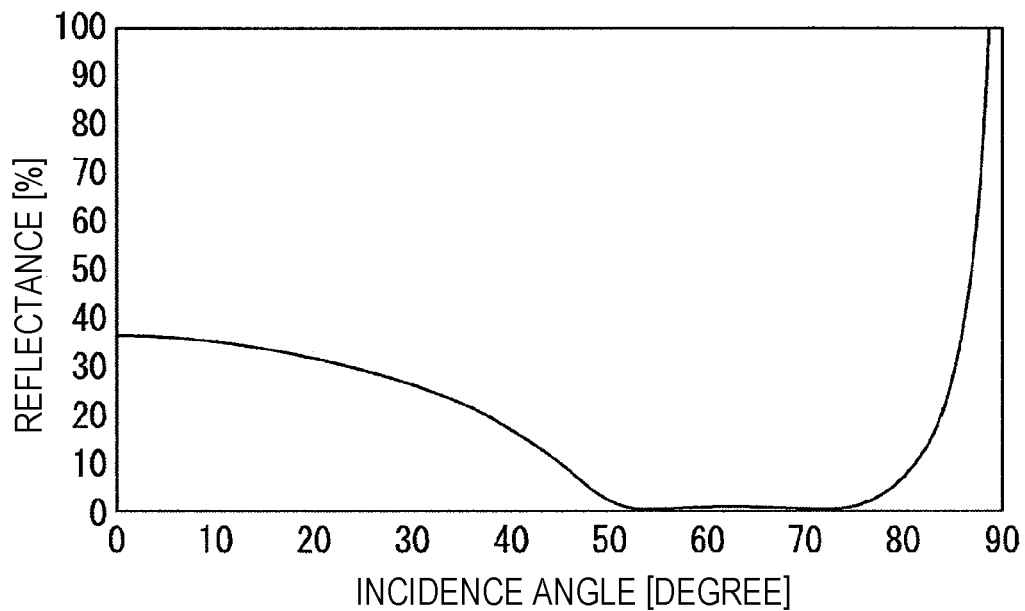
FIG. 4 is a graph illustrating a relationship between an incidence angle and a reflectance in a partially reflecting mirror.

The threshold value β1 is uniquely determined by the refractive index n of the light guide 18 and the light beam incidence angle with respect to the light guide 18. On the other hand, the threshold value 132 depends on the reflection characteristics of the mirror 20. FIG. 4 illustrates an example of the incidence angle—reflectance characteristics of the mirror used for this type of light guide device. For example, in a case where the mirror having the characteristics illustrated in FIG. 4 is used, in order to make the reflectance 0%, the limit incidence angle $\theta_{th}$ is set to equal to or lower than 80°.

In addition, the emission angle γ (refer to FIG. 2) of the light beam from the total reflection surface 18a (observer surface 18a1) of the light guide 18 is determined by the light guide angle α and the light beam angle η. That is, γ=α+η.

In a case where the light beam angle η is 10 degrees or 15 degrees and the refractive index n of the light guide 18 is 1.41 which is the refractive index of the silicone resin, 1.52 which is the refractive index of BK7 (glass material), or 1.73 which is the refractive index of episulphide (resin material), graphs indicating the light guide angle dependences of each mirror angle are illustrated in FIG. 6 to FIG. 11.

Figure 6:
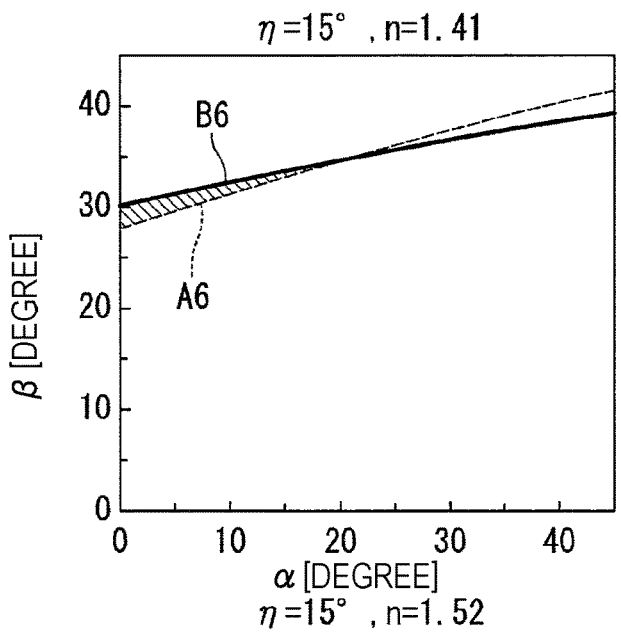
FIG. 6 is a graph illustrating a relationship between a light guide angle α and a mirror angle β at a specific light beam angle η and a refractive index n.
Figure 7:
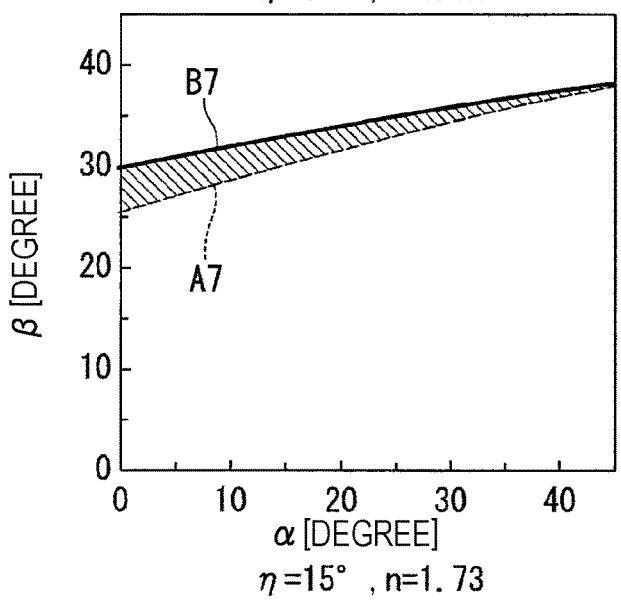
FIG. 7 is a graph illustrating a relationship between the light guide angle α and the mirror angle β at a specific light beam angle η and a refractive index n.
Figure 8:
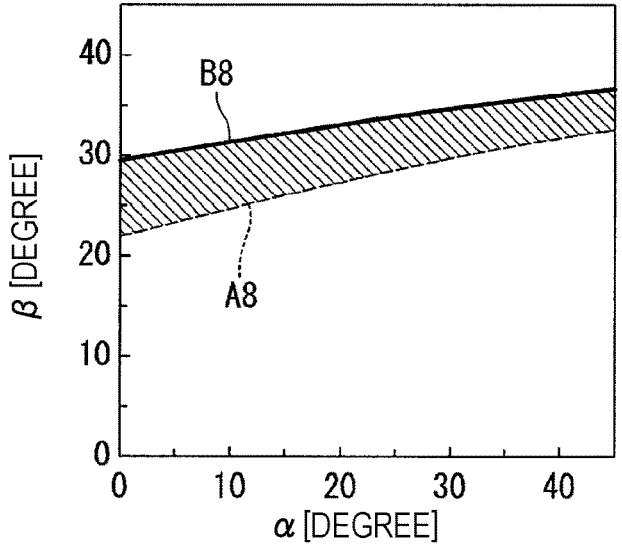
FIG. 8 is a graph illustrating a relationship between the light guide angle α and the mirror angle β at a specific light beam angle η and a refractive index n.
Figure 9:
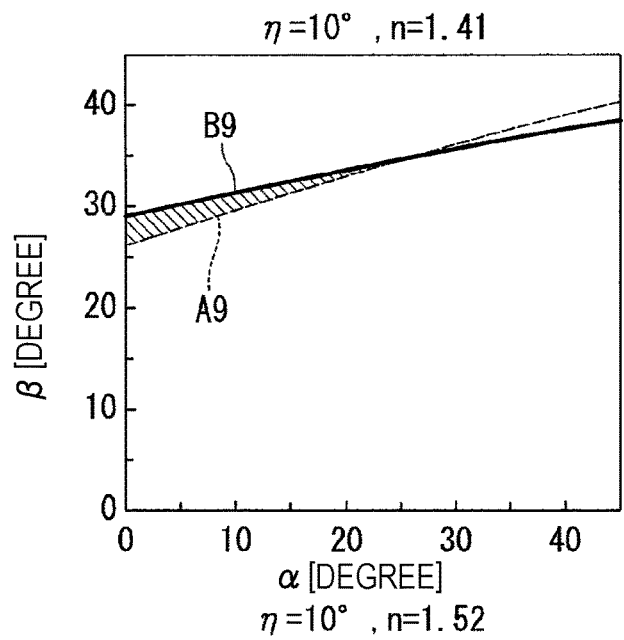
FIG. 9 is a graph illustrating a relationship between the light guide angle α and the mirror angle β at a specific light beam angle η and a refractive index n.
Figure 10:
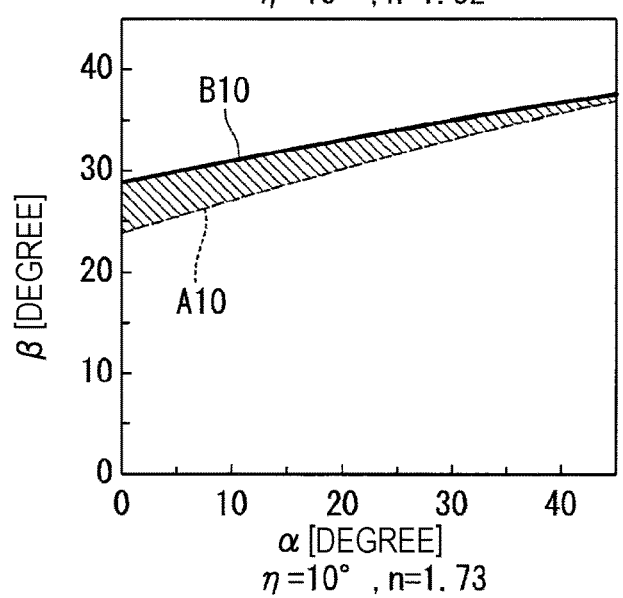
FIG. 10 is a graph illustrating a relationship between the light guide angle α and the mirror angle β at a specific light beam angle η and a refractive index n.
Figure 11:
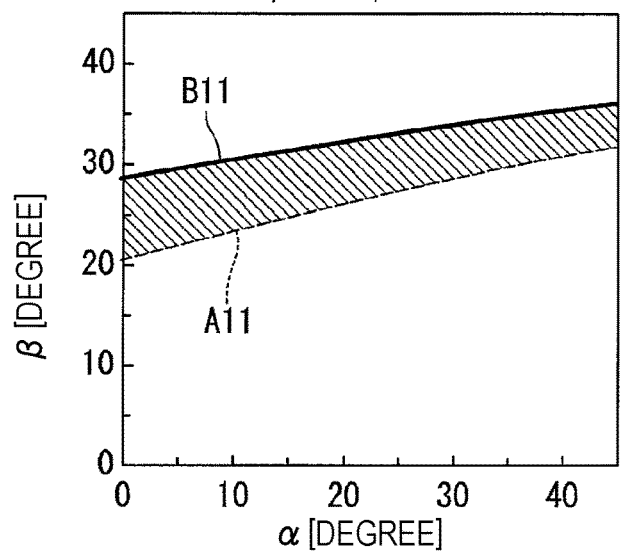
FIG. 11 is a graph illustrating a relationship between the light guide angle α and the mirror angle β at a specific light beam angle η and a refractive index n.

FIG. 6 is a graph in a case where η=15 degrees and n=1.41. FIG. 7 is a graph in the case where η=15 degrees and n=1.52. FIG. 8 is a graph in a case where η=15 degrees and n=1.73. FIG. 9 is a graph in a case where η=10 degrees and n=1.41. FIG. 10 is a graph in a case where η=10 degrees and n=1.52. FIG. 11 is a graph in a case where η=10 degrees and n=1.73.

In FIG. 6 to FIG. 11, the horizontal axis of the graph represents the light guide angle α (degree) and the vertical axis represents the mirror angle β (degree).

In FIG. 6 to FIG. 11, dashed lines of signs A6 to A11 are graphs (Expression (4)) illustrating the relationship between β1 and α, and solid lines of signs B6 to B11 are graphs (Expression (5)) illustrating the relationship between β2 and α. Therefore, in each figure, regions on the upper side of the graphs of signs A6 to A11 and lower side of the graphs of signs B6 to B11 (hatched region) are the regions satisfying β1<β≤β2, and the value of the light guide angle α can only be obtained in the range corresponding to the region described above. For example, in the case where η=15° and n=1.41 (FIG. 6), it is necessary to set α<20°. In a case where η=15° and n=1.52 (FIG. 7), it is necessary to set α<45.

In a case where the display apparatus 10 is used as the head mount display, since the light guide 18 needs to be disposed along the front face of the face portion, the angle α=45° is too large. From this viewpoint, the light guide angle α is preferably approximately 5° to 25°. On the other hand, in a case where the display apparatus 10 is used as a head-up display, the light guide angle α can be selected at a point up to the intersection of the two graphs.

Here, the inventor examined the actual occurrence of the display unevenness when changing the light guide angle α.

As described above, as the display unevenness appears due to the variations of the number of mirrors for transmission and as the mirror angle β increases, the display unevenness is reduced. Therefore, the mirror angle β is adjusted so as to be incident with the upper limit of the mirror angle β at the limit incidence angle $\theta_{th}$=80°. In addition, the reflectance of the mirror 20 is adjusted such that the reflectance increases from the side close to the incident portion 19 to the side far from the incident portion 19. For example, in order to make the reflectance at all the angles of view to be 10%, the reflectance of the first mirror from the incident portion side may be set to 10%, the reflectance of the second mirror may be set to 11.1% (=0.1/(1−0.1)), and the reflectance of the third mirror may be set to 12.5% (=0.1/(1−2×0.1)).

Figure 12:
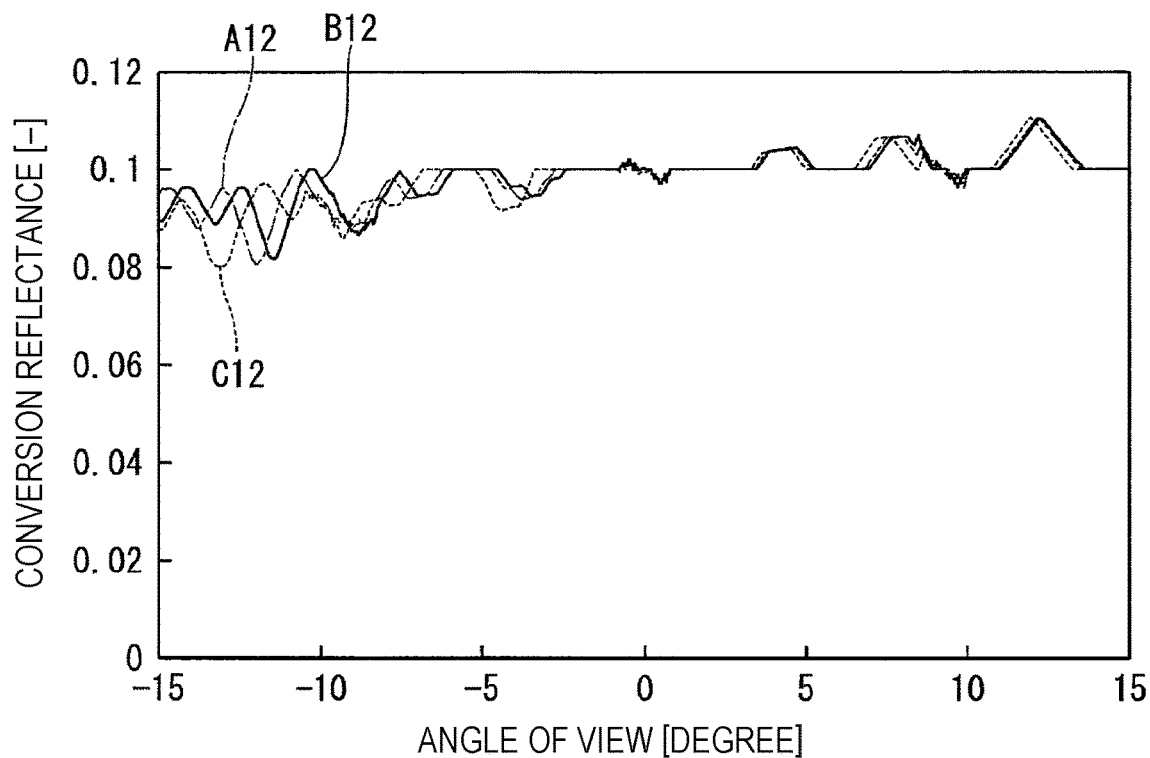
FIG. 12 is a graph illustrating a relationship between an angle of view and a conversion reflectance.

FIG. 12 is a graph illustrating an integrated reflectance which is a multiplication of the number of mirrors for transmission and the transmittance and the reflectance throughout the angles of view ±15 degrees under the condition of the reflectance described above and the refractive index n=1.52. In FIG. 12, the horizontal axis represents the angle of view (degree) and the vertical axis represents the integrated reflectance (−). The graph indicated by the dashed line of sign C12 illustrates a case where the light guide angle α is 0° (in a case where the light guide is not inclined), the graph indicated by two-dotted chain line of sign A12 illustrates a case where the light guide angle α is 10°, and the graph indicated by a solid line of sign B12 illustrates a case where the light guide angle α is 14°.

In FIG. 12, since the reflectance of each mirror is set such that the reflectance becomes 10% through all the angles of view, originally it is desirable that the integrated reflectance be constant at a value of 0.1. In a case where the light guide angle α is 10° (A12) and in a case where the light guide angle α is 14° (B12), It is found that the variation from the integrated reflectance 0.1 becomes small compared to the case where the light guide angle α is 0° (C12).

Figure 13:
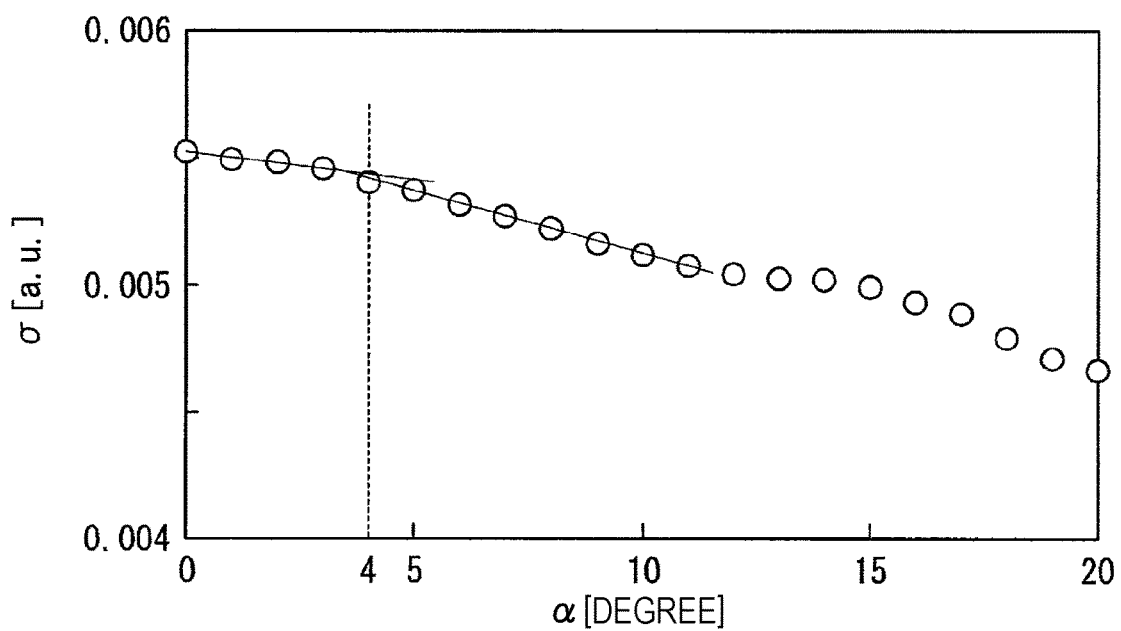
FIG. 13 is a graph illustrating a relationship between the light guide angle α and a standard deviation σ of the number of mirrors for transmission.

FIG. 13 is a graph illustrating a relationship between the light guide angle α in FIG. 12 and a standard deviation σ of integrated reflectance. In FIG. 13, the horizontal axis represents the light guide angle α (degree), and the vertical axis represents the standard deviation σ (a.u.).

As illustrated in FIG. 13, as the light guide plate angle α becomes larger than 0 degree, the standard deviation σ tends to decrease and it can be understood that the display unevenness decreases. Particularly, when the light guide plate angle α becomes equal to or larger than 4 degrees, it is found that the slope of the graph becomes larger than the slope of the graph when the light guide plate angle α is smaller than 4 degrees. Therefore, in this example, it is found that the effect of reducing the display unevenness can be clearly obtained when the light guide plate angle α is set to equal to or larger than 4 degrees.

In addition, the inventor obtained a light intensity distribution of the image at the pupil position when the reflectance of the mirror is 10%.

Figure 14:
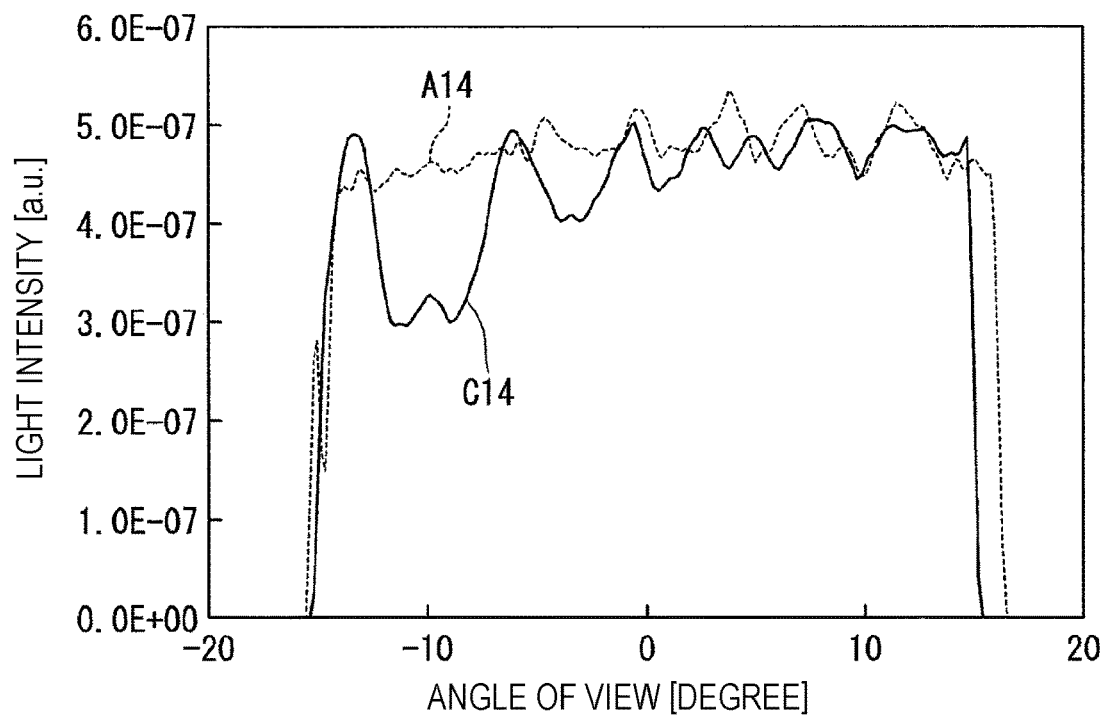
FIG. 14 is a graph illustrating a simulation result of a light intensity profile of an image at a pupil position in a specific diameter of a light receiver.

FIG. 14 is a graph illustrating the light intensity distribution of the image at the pupil position when the diameter of the light receiver is 0.5 mm.

Figure 15:
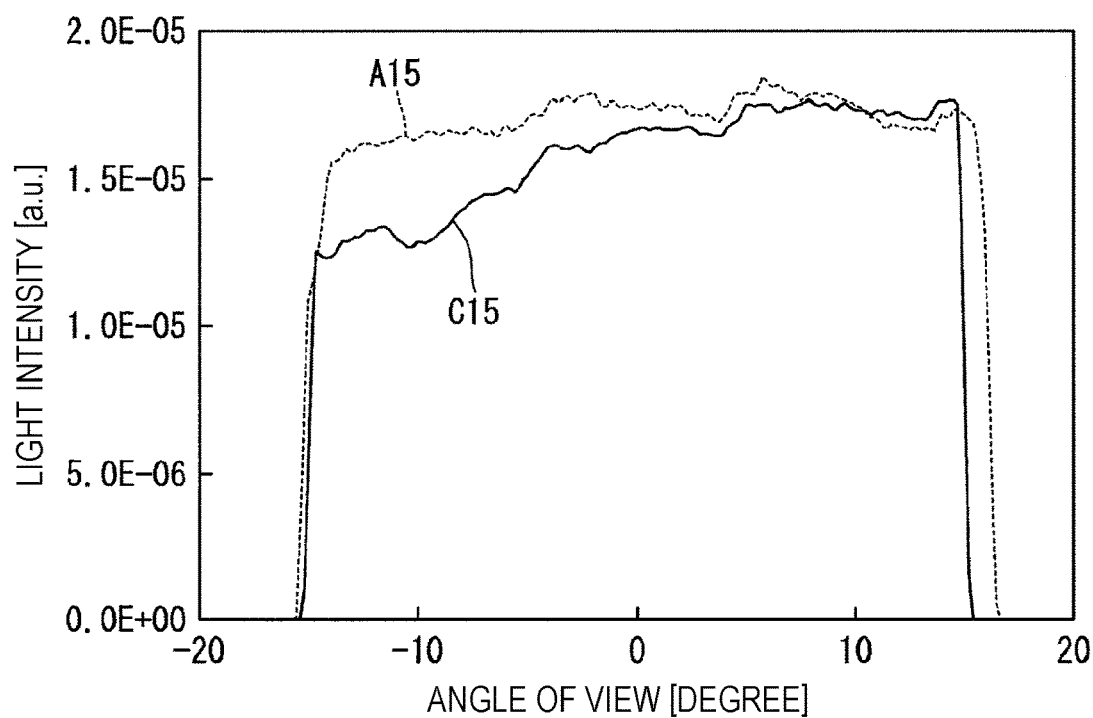
FIG. 15 is a graph illustrating a simulation result of a light intensity profile of an image at the pupil position in a specific diameter of the light receiver.

FIG. 15 is a graph illustrating the light intensity distribution of the image at the pupil position when the diameter of the light receiver is 3 mm.

In FIG. 14 and FIG. 15, the horizontal axis of the graph represents the angle of view (degree), and the vertical axis of the graph represents the light intensity (a.u.). The solid line graphs of the signs C14 and C15 illustrate the case where the light guide angle α is 0° (when the light guide is not inclined), and the dashed line graphs of the signs A14 and A15 illustrate the case where the light guide angle α is 15.4°.

As illustrated in FIG. 14, when the diameter of the light receiver is reduced, the change in light intensity can be clearly known. On the other hand, since generally a diameter of the human pupil is approximately 3 mm, as illustrated in FIG. 15, if the diameter of the light receiver is set to 3 mm, it is possible to estimate how the image is recognized in the eyes of the observer. As can be seen from both graphs, in a case where the angle of the light guide is inclined, the light intensity distribution can be kept small throughout all the angles of view. As a result, it is possible to reduce the display unevenness.

As described above, in the display apparatus 10 in the present embodiment, by inclining the light guide 18 with respect to the virtual plane KP perpendicular to the visual axis AX, and appropriately setting the mirror angle β, it is possible to reduce the error of number of mirrors for transmission when the image light GL is transmitted through a plurality of mirrors 20. As a result, the display unevenness can be reduced. Particularly, since the mirror angle β is set so as to satisfy Equations (4) and (5) above, both the loss of the image light and the occurrence of the double image (ghost) can be suppressed, and thus, a bright and clear image can be obtained.

In addition, by inclining the light guide 18, the light guide 18 can be disposed along the front face of the face, and the degree of freedom in designing the display apparatus 10 is improved.

In addition, by setting the light beam angle η equal to or larger than 10 degrees and equal to or smaller than 15 degrees, and setting the refractive index n of the light guide 18 equal to or larger than 1.4 and equal to or smaller than 1.8, it is possible to provide a highly practical display apparatus 10. Furthermore, by setting the light guide angle α equal to or higher than 4 degrees, it is possible to more reliably reduce the display unevenness.

The technical scope of the invention is not limited to the embodiment described above, and various modifications can be made without departing from the spirit of the embodiment.

For example, the specific configuration of each part such as the number, shape, material, or the like of the respective configuration elements configuring the display apparatus is not limited to the embodiment described above, and can be appropriately changed. For example, as the image forming device, in addition to the above liquid crystal display apparatus, an organic EL device, a combination of a laser light source and a MEMS scanner, or the like may be used.

The entire disclosure of Japanese Patent Application No. 2016-255073, filed Dec. 28, 2016 is expressly incorporated by reference herein.

What is claimed is:

1. A display apparatus comprising:
an image forming device that generates image light; and
a light guide that guides the image light, wherein
the light guide includes a first surface, a first mirror, and a second mirror,
the image forming device causes the image light to enter an inside of the light guide from the first surface,
the first mirror (i) causes a part of the image light guided inside the light guide to be reflected, and (ii) causes another part of the image light to be transmitted,
the second mirror (i) causes a part of the image light guided inside the light guide to be reflected, and (ii) causes another part of the image light to be transmitted,
the first mirror is disposed to be inclined with respect to the first surface,
the second mirror is disposed to be inclined with respect to the first surface,
in a plan view of the display apparatus, the first surface is disposed to be inclined with respect to a virtual plane perpendicular to a visual axis, and
when (i) an inclination angle of the first surface with respect to the virtual plane is defined as a light guide angle α, (ii) an inclination angle of each of the first mirror and the second mirror with respect to the first surface is defined as a mirror angle β, (iii) an angle between a light beam incident on an eye of an observer and the visual axis is defined as a light beam angle η, the light beam being a light beam that forms an angle of view among the image light, (iv) an incidence angle of the image light when the reflectance of the image light becomes 0 with respect to each of the first mirror and the second mirror is defined as a limit incidence angle $\theta_{th}$, and (v) a refractive index of the light guide is n, the angle β of each of the first mirror and the second mirror is set so as to satisfy Expressions (1), (2), and (3) described below:

$$\beta 1 < \beta \leq \beta 2 \quad (1)$$

$$\beta 1 = \frac{1}{2} \times [\sin^{-1}(1/n) + \sin^{-1}(\eta + \alpha)/n)] \quad (2)$$

$$\beta 2 = 1/3 \times [\theta_{th} + \sin^{-1}(\sin(\eta + \alpha)/n)] \quad (3)$$

in the plan view, the light guide angle α at which the first surface is inclined with respect to the virtual plane is larger than 0 degrees.

2. The display apparatus according to claim 1, wherein expressions (4) and (5) below are satisfied:

$$10 \text{ degrees the light beam angle } \eta \leq 15 \text{ degrees} \quad (4), \text{ and}$$

$$1.4 \text{ the refractive index } n \leq 1.8 \quad (5).$$

3. The display apparatus according to claim 1, wherein the light guide angle $\alpha$ is equal to or larger than 4 degrees.

4. The display apparatus according to claim 1, wherein
the light guide includes a second surface, the second surface is opposite the first surface in the plan view, and
the light guide guides the image light by the first surface and the second surface.

5. The display apparatus according to claim 1, wherein
the light guide includes an incident portion including a part of the first surface, and
the image forming device causes the image light to enter the inside of the light guide from a part of the first surface included in the incident portion.

6. The display apparatus according to claim 5, wherein
the incident portion includes a mirror,
the mirror of the incident portion is disposed to be inclined with respect to each of the first surface and the virtual plane,
an inclination angle of the mirror of the incident portion with respect to the first surface is defined as an angle $\omega$,
an inclination angle of the mirror of the incident portion with respect to the virtual plane is defined as an angle A, and
the inclination angle A of the mirror of the incident portion is set so as to satisfy an Expression $A=\omega+\alpha$.

* * * * *